(12) United States Patent
Emmerich et al.

(10) Patent No.: US 7,555,929 B2
(45) Date of Patent: Jul. 7, 2009

(54) MICROMECHANICAL SENSOR HAVING FAULT IDENTIFICATION

(75) Inventors: Harald Emmerich, Reutlingen (DE); Dirk Droste, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 11/133,834

(22) Filed: May 19, 2005

(65) Prior Publication Data

US 2005/0268718 A1      Dec. 8, 2005

(30) Foreign Application Priority Data

Jun. 2, 2004    (DE) .................. 10 2004 026 971

(51) Int. Cl.
*G01P 21/00*   (2006.01)
(52) U.S. Cl. .................................................. 73/1.38
(58) Field of Classification Search .................. None
See application file for complete search history.

(56) References Cited

U.S. PATENT DOCUMENTS

| | | | | |
|---|---|---|---|---|
| 4,410,875 A | * | 10/1983 | Spies et al. ................. 180/274 |
| 4,895,021 A | * | 1/1990 | Ishizeki ................... 73/114.24 |
| 5,212,640 A | * | 5/1993 | Matsuda ...................... 701/34 |
| 5,731,520 A | * | 3/1998 | Stevenson et al. ......... 73/514.32 |
| 5,737,961 A | * | 4/1998 | Hanisko et al. .............. 73/1.38 |
| 6,629,448 B1 | * | 10/2003 | Cvancara .................... 73/1.38 |
| 2004/0194532 A1 | * | 10/2004 | Lally et al. ................... 73/1.82 |

* cited by examiner

*Primary Examiner*—Robert R Raevis
(74) *Attorney, Agent, or Firm*—Kenyon & Kenyon LLP

(57) ABSTRACT

A sensor includes a micromechanical functional part and an electronic evaluation circuit which are in electrical connection to each other using electrical conductors. An arrangement for carrying out an auto-test of the sensor is provided in such a way that fault identification of at least one electrical connection is implemented.

8 Claims, 2 Drawing Sheets

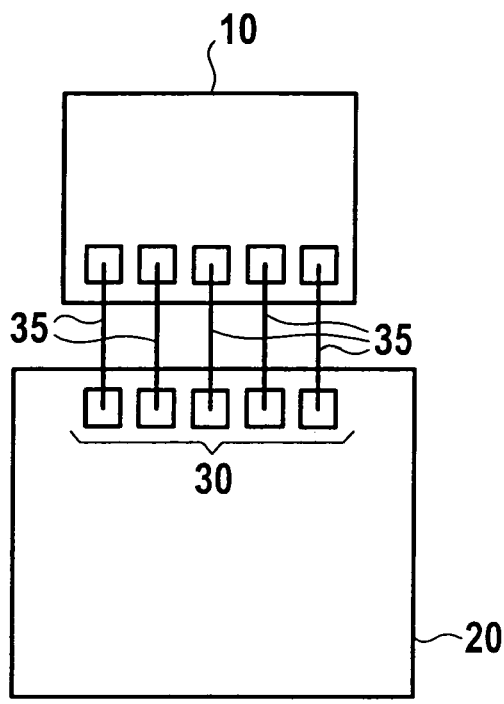
Fig. 1A
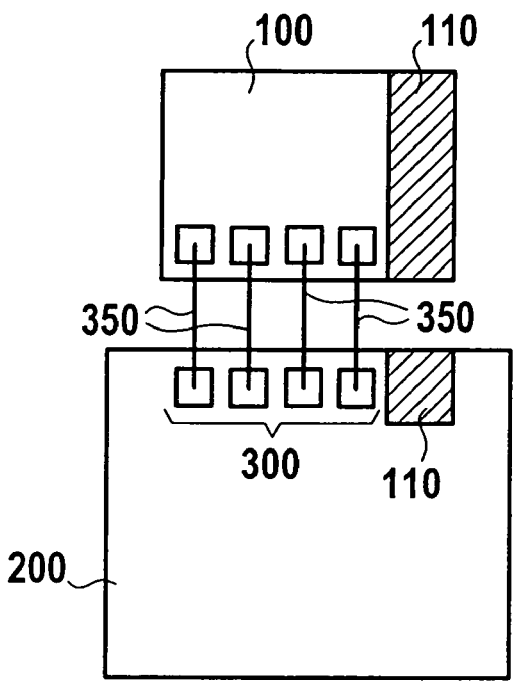
Fig. 1B
Fig. 2
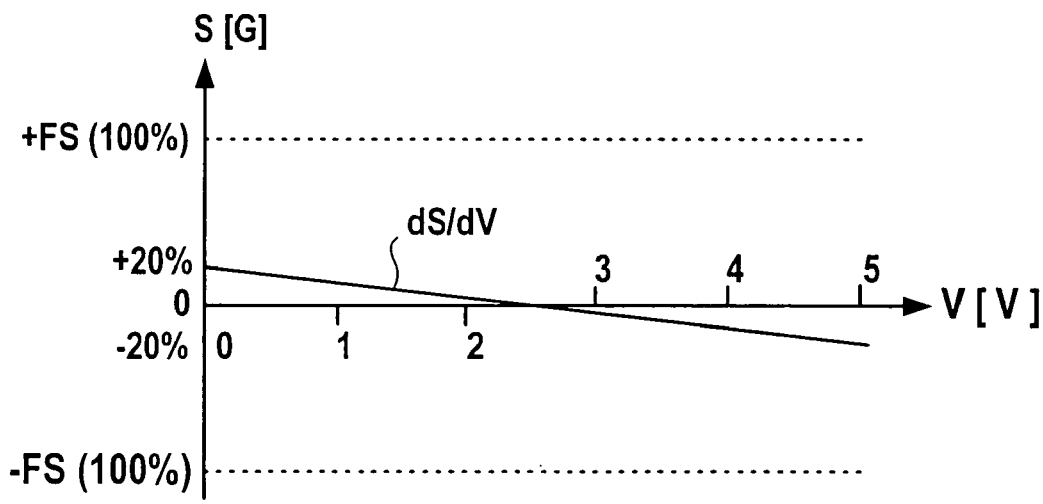

MICROMECHANICAL SENSOR HAVING FAULT IDENTIFICATION

FIELD OF THE INVENTION

The present invention relates to a sensor having a micromechanical functional part and an electronic evaluation circuit which are in contact using electrical conductors.

BACKGROUND INFORMATION

In capacitively evaluated inertial sensors, especially acceleration sensors having comb structures, signals are transmitted via two contacts (C1, C2) between the evaluation circuit and the sensor element. Via an additional contact (CM), the deflected state of the comb structure is obtained electrically capacitively as a function of the acceleration. For this purpose, the substrate of the sensor element is held to a specified potential using an evaluation circuit, via a fourth contact, substrate contact (CS). If this substrate contact is separated in operation by faulty connecting technique or fatigue, a drifting potential is created as a result of this high-ohmic or open connection. Because of field line shifts and appertaining deflections of the comb structure, conditions in the electrostatic configuration may be reached that correspond to those of an externally applied acceleration, without this actually being the case. In particular, in the case of applications critical to safety, such as ESP, air bag, rollover, ABS and others, this may make fault identification in the electrical connection a requirement.

In the related art, this fault identification, especially the contact-breaking or bond-breaking identification is ensured by an additional contact. By an impressed current over the two contacts, a potential difference may be determined in case of an interruption of a connection that might arise. If the electrical connections are carried out redundantly, the probability that two contacts fulfilling the same function are interrupted is low. However, during the course of further miniaturization of micromechanical sensors, space requirements of contact areas and electrical conducting connections has increasingly become a limiting factor.

SUMMARY OF THE INVENTION

The present invention relates to a sensor having a micromechanical functional part and an electronic evaluation circuit which are in contact with each other using electrical conductors. The crux of the present invention is that means for carrying out an auto-test of the sensor are provided in such a way that fault identification of at least one electrical connection is implemented. The sensor according to the present invention offers the advantage that, as a result of the auto-test, redundant electrical connections may be dispensed with. This makes for space saving on the sensor element and in the evaluation circuit of the sensor. This yields lower parts costs.

One advantageous embodiment of the present invention includes an operating state in which the auto-test takes place, and the sensor has an additional operating state in which a normal measuring operation takes place. In this way, the sensor may first of all carry out the auto-test, and then take up the normal measuring operation, if it has passed the auto-test.

Another advantageous embodiment of the present invention includes that the means for carrying out the auto-test of the sensor is provided in such a way that the auto-test is able to take place during the normal measuring operation. Because of that, the correct functioning of the sensor may be tested at any time, even during the measurements.

It is of advantage that the sensor represents a capacitive sensor, especially a sensor having a differential capacitor structure. Capacitive sensors are susceptible in a special way to potential fluctuations and to faulty signals as a result of that.

It is advantageous that the micromechanical functional part is situated on one substrate and the electronic evaluation circuit is situated on at least one other substrate. When the micromechanical functional parts and the evaluation circuit are situated on different substrates, a specified common potential created by electrical connecting lines is especially important.

In addition, it is advantageous that, using the auto-test, the condition of a substrate connection and/or ground connection between the micromechanical functional part and the electronic evaluation circuit is able to be checked. Faulty measurements as a result of faulty substrate connections pose a problem in micromechanical sensors that is difficult to detect. The condition of this electrical connection is also able to be checked advantageously with respect to interruption or a high-ohmic state.

It is particularly advantageous that the auto-test includes emitting an electrical signal by the electronic evaluation circuit to the micromechanical functional part and a resulting sensor measuring signal. In this way, measuring errors may already be reflected in the test operation as a result of potential changes.

It is also of advantage that the auto-test is implemented in such a way that it determines the electrical conductivity of at least one connection and/or the interruption of this connection. A possibly increased resistance of an electrical connection, or its interruption, are decisive preconditions for the appearance of potential fluctuations.

Thus, in summary, what is advantageous is the space saving on the sensor element and the evaluation circuit by the omission of a contact or a bonding land or a double bond at simultaneously high monitoring certainty. Also advantageous is the low circuit expenditure for the auto-test because of digital signal processing. The contact breaking identification may advantageously take place at a contact that is present anyway. Even a worsening contact (slow dissolution of a bond, Kirkendall Effect, . . . ) may be detected early by monitoring the transient response, before there is a total breakdown.

BRIEF DESCRIPTION OF THE DRAWINGS

FIG. 1A schematically shows a micromechanical sensor according to the related art.

FIG. 1B schematically shows a micromechanical sensor according to the present invention, having fault identification.

FIG. 2 shows the dependency of the sensor output signal on the voltage present at the substrate.

DETAILED DESCRIPTION

Figure 3:
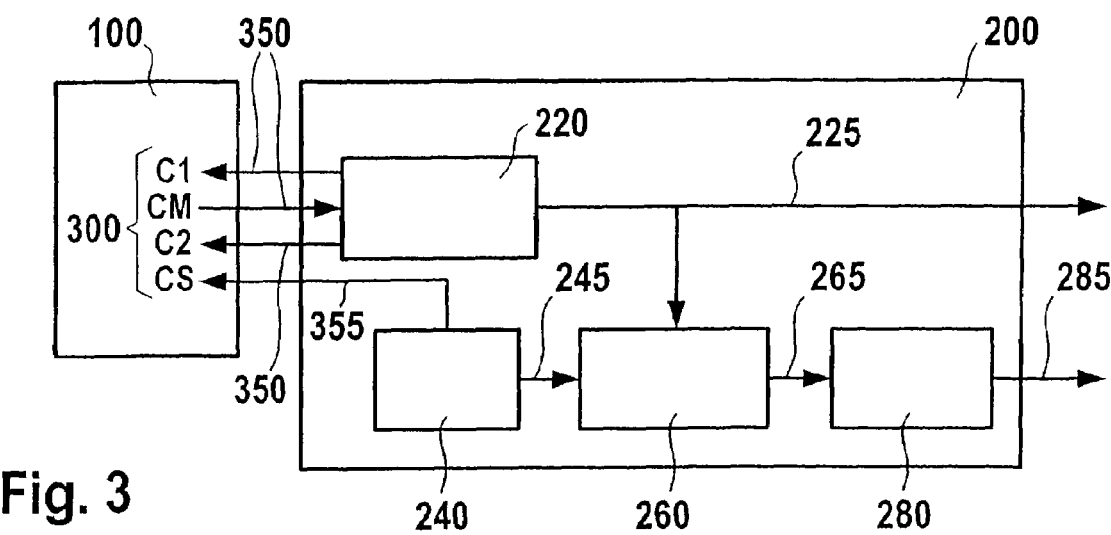
FIG. 3 shows a sensor according to the present invention, having an evaluation circuit in schematic representation.

FIG. 1a schematically shows a micromechanical sensor according to the related art. The sensor includes a micromechanical functional part 10 and an electronic evaluation circuit 20, between which there are electrical connections. The electrical connections in this example include electrical conductors 35 which are contacted to contact areas. In order to transmit four signals, here there are five connections, i.e. one connection is redundant.

FIG. 1b schematically shows a micromechanical sensor according to the present invention, having fault identification. The sensor includes a micromechanical functional part 100 and an electronic evaluation circuit 200, between which there are electrical connections. The electrical connections in each case include electrical conductors 350 which are contacted to contact areas 300. In contrast to the sensor according to the related art as in FIG. 1, in this example of a sensor according to the present invention, only four connections are still present. The previously present, redundant fifth electrical connection has been omitted. Because of this, there comes about a savings potential in chip area 110. Chip area 110 may be used for miniaturization of the sensor or for implementing additional functions.

FIG. 2 shows the dependency of the sensor output signal of a micromechanical sensor on the voltage present at the substrate. The diagram shows a relative sensor signal S plotted against a substrate voltage V. In this example, the sensor signal is a linear function of substrate voltage V, having a slope dS/dV. Other functional relationships are possible. The sensitivity of the so-called feedthrough dS/dV is also shown here only in exemplary fashion. It underlies various parameters of the sensor and the evaluation circuit, and should be determined in the system. In the example shown here, a change in sensor signal S of a magnitude of about ca. ±20% of the measuring range is shown, at a change in substrate voltage V of 5V.

FIG. 3 shows a sensor according to the present invention, having an evaluation circuit in schematic representation. Electronic evaluation circuit 200 includes an evaluation module 220, an excitation module 240, a demodulation module 260 as well as a weighting module 280. The evaluation module 220 has as its task the signal evaluation of a typical capacitive sensor. It is connected via electrical connections 350 to electrodes C1, CM and C2 of a differential capacitor. Evaluation module 220 evaluates the capacity changes of the differential capacitor and generates from that a sensor output signal 225. Electronic evaluation circuit 200 is additionally connected to micromechanical functional part 100 by an additional electrical connection 350. This electrical connection represents a so-called substrate line 355 and is developed redundant in the related art, or it is used specially via the multiple design of the contact monitoring. In the related art, the contact monitoring takes place by an impressed current via the two contacts. In response to a possible appearance of a connection, a potential difference may then be established.

In the example described here of a sensor according to the present invention, substrate line 355 is only designed simply, but is monitored using an auto-test function. Substrate line 355 connects excitation module 240 to substrate contact CS. In an operating state. For example after the switching in of the sensor, excitation module 240 now transmits a signal pattern to micromechanical functional part 100, within the scope of an auto-test. As a result, according to the dependency shown in FIG. 2, a measuring signal is created which is converted to a sensor output signal 225 by signal evaluation module 220. Besides the test signal, excitation module 240 also makes available a correlation signal 245. Correlation signal 245 and sensor output signal 225 are made available to demodulation module 260. In demodulation module 260 a correlated demodulation of the signals takes place. A demodulated output signal 265 is made available to weighting module 280. Finally, in weighting module 280, based on evaluated signal pattern 265, the condition of substrate line 355 is weighted and a corresponding signal 285 is emitted.

The measuring signal of micromechanical functional part 100 may be digitized in evaluation circuit 220, and the entire signal processing, even of the auto-test, may be done in digital form.

Figure 4A:
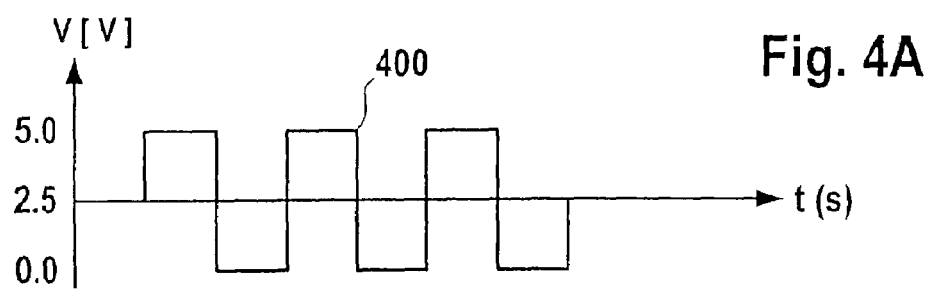
FIG. 4A shows a possible excitation signal of the micromechanical sensor according to the present invention, having fault identification.

FIG. 4A shows a possible excitation signal of the micromechanical sensor according to the present invention, having fault identification. Signal voltage V is shown plotted against time T in the diagram. In the example shown here, excitation module 240 emits a periodic, rectangular test signal pattern 400. However, other signal shapes are also conceivable.

Figure 4B:
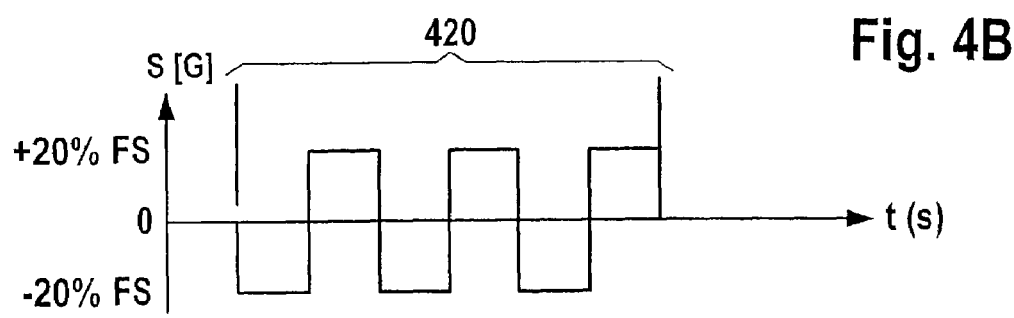
FIG. 4B shows the test response signal of a properly functioning micromechanical sensor according to the present invention, having fault identification.

FIG. 4B shows the test signal response of a correctly functioning sensor. The diagram shows the sensor signal S plotted against time T. Signal pattern 420 represents the response signal to test signal pattern 400. Signal pattern 420, as the response signal, follows test signal pattern 400 practically free of delay with respect to its time sequence. Thus, the potential connection between evaluation circuit 200 and micromechanical functional part 100 is low-ohmic, or high-grade conductive, and thus intact.

Figure 4C:
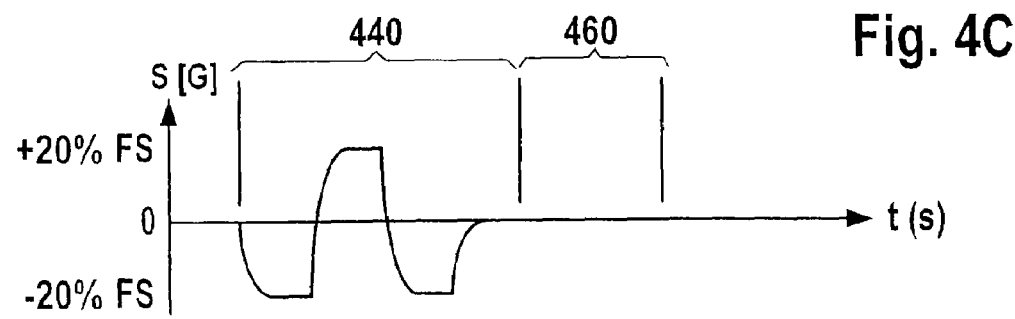
FIG. 4C shows a test response signal of a defective micromechanical sensor according to the present invention, having fault identification.

FIG. 4C represents the signal response of a defective sensor. The diagram shows sensor signal S plotted against time T. The first signal pattern 440 shown in the diagram points to a high-ohmic or low-conductive substrate line 355. The micromechanical functional part follows potential changes specified by test pattern 400 only with time delay. Second signal pattern 460 shown in the diagram shows the absence of any dependence of the sensor output signal on test signal pattern 400. Thus, the resistance would in practice be infinite, or the conductivity equal to zero. This circumstance leads one to conclude that there is a complete interruption of substrate line 355, for instance, conditioned on the breaking of the electrical line connection from a contact surface, or a crack in the conductor of substrate line 355.

In summary, the construction and the function of the sensor may be described as follows. The substrate potential of the sensor is specified in running operation outside the test phase, for bond breaking identification, at a constant reference voltage, such as ground (GND) or, in the case of a symmetrical voltage supply, at a value such as the median (VDD/2). The output signal of the capacitive measuring system is thus only dependent on mass inertia forces acting on the seismic mass or electrostatic field forces. In a test phase, by a specified change in the substrate potential of micromechanical functional part 100, using a test signal pattern 400, changes in the configuration of the electrostatic forces within the sensor may be generated, which establish an additional force acting on the seismic mass. Because of this additional force, an additional signal is additively superimposed on the normal output signal of the sensor. The height and pattern over time of this signal are well defined corresponding to test signal 400. For this, an excitation module 240 is provided in evaluation circuit 200, which is designed, for example, as an ASIC circuit, and with whose aid various voltages may be applied to substrate contact CS of micromechanical functional part 100. Excitation module 240 further makes possible arbitrarily determining the pattern of the voltages plotted against the course of time.

Because of the various voltages at the sensor substrate, changes in the output signal of the measuring system occur in the course of time which, by correlated demodulation, may be cleared up by a superimposed acceleration signal. The signal thus cleared up may subsequently be weighted via tolerance tests in weighting module 280. In this context, using various test signal patterns 400, the substrate potential, and thus the condition of substrate line 355, may be checked, in order to conclude that there is a high ohmage of the electrical connection. For various applications, different patterns may be used, so that the output signal may be cleared up and evaluated by appropriate correlated demodulation of true sensor signals, such as acceleration signals. The micromechanical sensor according to the present invention may especially be an inertial sensor, such as an acceleration sensor or a yaw-rate sensor.

What is claimed is:

1. A sensor comprising:
   a micromechanical functional part;
   an electronic evaluation circuit;
   at least one electrical connection for electrically connecting the micromechanical functional part and the electronic evaluation circuit using electrical conductors; and
   an arrangement for carrying out an auto-test during an operating state of the sensor such that a fault identification of the at least one connection is implemented,
   wherein the sensor has an operating state in which the auto-test occurs and another operating state in which a normal measuring operation occurs, and
   wherein the sensor is a capacitive sensor, having a differential capacitor structure.

2. The sensor according to claim 1, wherein the micromechanical functional part is situated on one substrate and the electronic evaluation circuit is situated on at least one other substrate.

3. The sensor according to claim 1, wherein the auto-test includes emitting an electrical signal by the electronic evaluation circuit to the micromechanical functional part and a sensor measuring signal resulting therefrom.

4. The sensor according to claim 1, wherein the auto-test is implemented in such a way that it determines at least one of (a) an electrical conductivity of the at least one connection and (b) an interruption of the at least one connection.

5. A sensor comprising:
   a micromechanical functional part;
   an electronic evaluation circuit;
   at least one electrical connection for electrically connecting the micromechanical functional part and the electronic evaluation circuit using electrical conductors; and
   an arrangement for carrying out an auto-test during an operating state of the sensor such that a fault identification of the at least one connection is implemented,
   wherein the sensor has an operating state in which the auto-test occurs and another operating state in which a normal measuring operation occurs, and
   wherein, using the auto-test, a condition of at least one of a substrate connection and a ground connection between the micromechanical functional part and the electronic evaluation circuit is checked.

6. The sensor according to claim 5, wherein the micromechanical functional part is situated on one substrate and the electronic evaluation circuit is situated on at least one other substrate.

7. The sensor according to claim 5, wherein the auto-test includes emitting an electrical signal by the electronic evaluation circuit to the micromechanical functional part and a sensor measuring signal resulting therefrom.

8. The sensor according to claim 5, wherein the auto-test determines at least one of an electrical conductivity of the at least one connection, and an interruption of the at least one connection.

* * * * *